United States Patent
Wall et al.

(10) Patent No.: US 12,000,316 B2
(45) Date of Patent: Jun. 4, 2024

(54) INTERNAL COMBUSTION ENGINE

(71) Applicant: INNIO Jenbacher GmbH & Co OG, Jenbach (AT)

(72) Inventors: Gunther Wall, Bad Haring (AT); Wolfgang Madl, Axams (AT); Johannes Laubach, Weer (AT); Peter Feyrsinger, Kitzbuhel (AT); Helmuth Steinhardt, Innsbruck (AT); Manfred Maderbock, Wiesing (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 213 days.

(21) Appl. No.: 17/618,388

(22) PCT Filed: Jun. 12, 2019

(86) PCT No.: PCT/AT2019/060193
§ 371 (c)(1),
(2) Date: Dec. 10, 2021

(87) PCT Pub. No.: WO2020/247989
PCT Pub. Date: Dec. 17, 2020

(65) Prior Publication Data
US 2022/0349324 A1   Nov. 3, 2022

(51) Int. Cl.
*F01M 11/03* (2006.01)
*F16N 39/06* (2006.01)

(52) U.S. Cl.
CPC ............. *F01M 11/03* (2013.01); *F16N 39/06* (2013.01)

(58) Field of Classification Search
CPC .......... B04B 5/005; F01M 11/03; F16N 39/06
See application file for complete search history.

(56) References Cited

U.S. PATENT DOCUMENTS

| | | | | |
|---|---|---|---|---|
| 3,127,255 A | * | 3/1964 | Winslow | B01D 21/10 55/421 |
| 3,432,091 A | * | 3/1969 | Beazley | B04B 5/005 494/36 |
| 3,879,294 A | * | 4/1975 | Ellis | F15B 21/041 494/36 |

(Continued)

FOREIGN PATENT DOCUMENTS

| | | |
|---|---|---|
| DE | 29609980 U1 | 10/1996 |
| DE | 102015204293 A1 | 9/2016 |

(Continued)

OTHER PUBLICATIONS

PCT International Search Report of Application No. PCT/AT2019/060193 dated Feb. 13, 2020; 6 pages.

*Primary Examiner* — Michael A Riegelman
(74) *Attorney, Agent, or Firm* — Fletcher Yoder, P.C.

(57) ABSTRACT

An internal combustion engine includes a centrifuge, a centrifuge pump, and a controller. The centrifuge is configured to separate foreign particles from a lubricant, wherein the centrifuge is so designed that a lubricant volumetric flow directed into the centrifuge produces and/or maintains a rotational movement of the centrifuge. The centrifuge pump is configured to produce and/or increase the lubricant volumetric flow directed into the centrifuge. A controller is configured to provide control of the centrifuge pump according to a setpoint value for a kinematic operating parameter and/or for a setting parameter of the centrifuge pump. The controller is configured to gradually change the setpoint value for control of the centrifuge pump upon shutdown or starting of the centrifuge pump.

22 Claims, 2 Drawing Sheets

(56) References Cited

U.S. PATENT DOCUMENTS

| | | | | |
|---|---|---|---|---|
| 4,353,499 A * | 10/1982 | Simonds | ............... | B04B 1/04 494/68 |
| 5,707,519 A * | 1/1998 | Miller | ............... | B04B 5/005 494/36 |
| 5,816,212 A * | 10/1998 | Lindquist | ............... | F16N 7/40 210/167.04 |
| 6,368,513 B1 * | 4/2002 | Christophe | ............ | B01D 36/02 210/411 |
| 6,620,090 B2 * | 9/2003 | Fischer | ............... | B04B 9/08 494/83 |
| 7,674,376 B1 * | 3/2010 | Herman | ............... | B04B 5/005 210/488 |
| 7,775,963 B2 * | 8/2010 | Samways | ............... | F01M 13/04 494/49 |
| 10,738,664 B2 * | 8/2020 | Hashimoto | ............ | F01M 1/16 |
| 10,883,397 B2 * | 1/2021 | Burford | ............... | F01M 1/10 |
| 2001/0012814 A1 * | 8/2001 | May | ............... | B04B 9/06 494/24 |
| 2003/0078152 A1 * | 4/2003 | Fischer | ............... | B04B 9/06 494/10 |
| 2004/0152578 A1 * | 8/2004 | Samways | ............... | B04B 11/06 494/49 |
| 2007/0249479 A1 * | 10/2007 | Eliasson | ............... | B01D 45/14 494/83 |
| 2010/0180854 A1 * | 7/2010 | Baumann | ............... | B04B 5/005 123/196 R |
| 2011/0011789 A1 * | 1/2011 | Hoff | ............... | B04B 7/00 210/362 |
| 2011/0011795 A1 * | 1/2011 | Hoff | ............... | B04B 5/005 210/512.1 |
| 2016/0304805 A1 * | 10/2016 | Wase | ............... | B04B 5/005 |
| 2017/0211431 A1 * | 7/2017 | Hashimoto | ............ | F01M 1/02 |
| 2018/0066550 A1 * | 3/2018 | Burford | ............... | F01M 1/10 |
| 2022/0349324 A1 * | 11/2022 | Wall | ............... | F16N 39/06 |

FOREIGN PATENT DOCUMENTS

| | | |
|---|---|---|
| DE | 102015211103 A1 | 12/2016 |
| DE | 102017000427 A1 | 7/2017 |
| DE | 102017006348 A1 | 3/2018 |
| GB | 2302049 A | 1/1997 |
| WO | 2016132308 A1 | 8/2016 |

* cited by examiner

INTERNAL COMBUSTION ENGINE

CROSS-REFERENCE TO RELATED APPLICATION

This application is a National Stage entry from, and claims benefit of, PCT Application No. PCT/AT2019/060193, filed on Jun. 12, 2019; entitled "INTERNAL COMBUSTION ENGINE."

BACKGROUND

The present application concerns an internal combustion engine having the features of the classifying portion described below.

Internal combustion engines of the general kind set forth include:
- at least one centrifuge for separating foreign particles from a lubricant, wherein the at least one centrifuge is so designed that a lubricant volumetric flow directed into the at least one centrifuge produces and/or maintains a rotational movement of the at least one centrifuge,
- at least one centrifuge pump for producing and/or increasing the lubricant volumetric flow directed into the at least one centrifuge, and
- an open-loop or closed-loop control device for open-loop and/or closed-loop control of the at least one centrifuge pump according to a setpoint value for a kinematic operating parameter and/or for a setting parameter of the centrifuge pump.

An internal combustion engine having an oil centrifuge is known, for example, from DE 10 2015 204 293 A1.

Further embodiments known by the state of the art are disclosed, for example, by DE 10 2015 211 103 A1, DE 10 2017 000 427 A1, DE 10 2017 006 348 A1, U.S. Pat. No. 6,620,090 B2, and DE 296 09 980 U1.

Centrifuges are particularly well suited for separating foreign particles in a lubricant, which are present in the lubricant in large amounts, more specifically in dependence on the difference in density between the medium and the particles, and irrespective of the size of the foreign particles. Many situations involve using centrifuges, which are driven by the pressure in the lubricant to be centrifuged (e.g., in the lubricant volumetric flow directed into the centrifuge) or by the backpressure caused by the medium issuing at tangential outlet bores at the centrifuge rotor. It is also known for the centrifuge to be of a self-lubricated design, that is to say, the lubricant to be centrifuged is also used for lubricating the centrifuge rotor.

Centrifuges are also known, which are driven directly externally, for example, by means of an electric motor.

Particularly, when dedicated centrifuge pumps are used in order to generate or boost the lubricant volumetric flow directed into the centrifuge, the problem which arises in that respect is that, for example, when the centrifuge pump is shut down, the pressure in the lubricant to be centrifuged suddenly decreases greatly because the centrifuge pump is no longer being driven.

That also has the consequence that lubrication of the rotor of the centrifuge, based on the described principle of self-lubrication, is no longer adequate.

As those centrifuges are operated at very high rotary speeds, the abrupt drop in lubrication leads to instability of the rotor, and in particular, wobbling movements within the housing and severe friction at the bearings of the rotor and spindle. As a result, severe vibrations occur which entail damage to the centrifuge or at least greatly increased wear.

BRIEF DESCRIPTION

Therefore, an aspect of the invention is to provide an internal combustion engine, wherein instabilities of the rotor of the centrifuge are avoided or at least reduced during shutdown of the centrifuge pump.

That aspect is attained by the features described and claimed below. That is effected in that the open-loop or closed-loop control device is adapted to gradually change the setpoint value for open-loop or closed-loop control of the at least one centrifuge pump upon shutdown or starting of the centrifuge pump.

It is preferably provided that shutdown or starting of the centrifuge pump is effected independently of shutdown or starting of the internal combustion engine.

The centrifuge pump (which is part of an oil purification system) can therefore be operated possibly independently of operation of the engine. Oil purification is effected generally, but not exclusively, in the course of operation of the internal combustion engine. If the oil purification system is turned off, then the centrifuge pump must be shut down.

Expressions like "separating foreign particles from the lubricant" are used, in particular, to mean at least partial separation or filtration of the foreign particles out of the lubricant.

The reference to the effect that the lubricant volumetric flow is directed into the at least one centrifuge does not necessarily mean a spatial orientation of the lubricant volumetric flow. According to an embodiment of the invention, however, it is established that the lubricant volumetric flow serves on the one hand to create the rotational movement of the at least one centrifuge (e.g., in particular, the centrifuge rotor) and on the other hand the lubricant forming the lubricant volumetric flow experiences separation of foreign particles by the at least one centrifuge.

Foreign particles to be separated can be, for example, soot particles which are produced upon combustion or due to high temperatures which otherwise occur, or metal particles created by wear.

Setpoint values for a kinematic operating parameter and/or for a setting parameter of the centrifuge pump can preferably involve a rotary speed of a pump motor. Alternatively, or additionally, a pump rotary frequency can be used. A setting parameter of a variable displacement pump can be, for example, a setting angle.

Similarly to the gradual change, according to an embodiment of the invention, in the setpoint value for open-loop or closed-loop control of the at least one centrifuge pump upon shutdown, that can also be provided upon starting of the centrifuge pump. In that way, it is possible, for example, to avoid pressure peaks which occur when the at least one centrifuge pump is already being operated at full delivery power, but the corresponding rotational speed of the at least one centrifuge is not yet reached.

It is to be pointed out that the at least one centrifuge pump does not have to be a centrifugal pump. The expression centrifuge pump only indicates that the at least one centrifuge pump is associated with the at least one centrifuge, in the sense that the at least one centrifuge pump provides or boosts the lubricant volumetric flow for producing and maintaining the rotational movement of the at least one centrifuge.

The expression the gradual change, in accordance with an embodiment of the invention, in the setpoint value for the at least one centrifuge pump can denote that a setpoint value or a plurality of setpoint values applies or apply at least for a certain period of time, which setpoint value or values is or are between the setpoint value when the centrifuge pump is stationary (e.g., in fact, generally zero) and that during normal operation of the centrifuge pump.

In other words, the shutdown or startup procedure of the at least one centrifuge pump is to occur over a certain period of time in order to avoid the described negative effects upon suddenly starting and stopping the centrifuge pump. In particular, the period of time can be so selected that, during shutdown or starting, on average (e.g., over the shutdown or starting procedure), at most a tenth of a revolution per second of the centrifuge is deducted or added. Preferably, at most a fifth of a revolution per second, and particularly, preferably at most one revolution per second, is deducted or added.

The gradual change can be effected by open-loop or closed-loop control of the centrifuge pump in accordance with a predeterminable or dynamically generated time profile for the setpoint values. By virtue of that gradual transition between operating state and stopped, the described negative effects of an abrupt transition between normal operation of the at least one centrifuge pump and shutdown thereof (and vice-versa) are to be at least partially avoided.

The at least one centrifuge can preferably have a rotor (e.g., a centrifuge rotor), a housing, and a connection or other kind of feed for the lubricant volumetric flow of the lubricant to be centrifuged.

The lubricant used can preferably be lubricating oil as the main constituent, in which case various additives may be included in order to influence the physical and chemical properties of the lubricating oil as desired.

The centrifuge pump can be started and/or shut down simultaneously with the internal combustion engine. Alternatively, or additionally, the centrifuge pump can also be started or shut down when the internal combustion engine is not in operation. It would, in principle, also be conceivable for the centrifuge pump to be shut down and/or started during operation of the internal combustion engine.

Advantageous developments of the embodiments of the invention are recited in the appendant claims.

It can be provided that the open-loop or closed-loop control device is adapted to gradually reduce the setpoint value for open-loop and/or closed-loop control of the at least one centrifuge pump upon shutdown of the centrifuge pump/ internal combustion pump and/or to gradually increase the setpoint value upon starting of the internal combustion pump.

Particularly, preferably, it can be provided that the open-loop or closed-loop control device is adapted to reduce or increase the setpoint value in accordance with at least one—preferably linear—ramp. That is particularly easy to implement. Ramps, which are not completely linear, are to be deemed to be ramps in accordance with embodiments of the invention. Such deviations from purely linear ramps can be afforded, for example, by composite ramps with a varying gradient or a preliminary control which influences the setpoint values.

As an alternative to the use of ramps for the gradual change in the setpoint values, it would be possible to have recourse, for example, to a step profile or similar.

There can be provided a pump motor for driving the at least one centrifuge pump, wherein the setpoint value can preferably be a rotary speed of the pump motor.

It is possible to provide a frequency converter for the centrifuge pump. It is possible in that way easily to implement open-loop or closed-loop control of a rotary speed or rotary frequency of the pump motor.

The open-loop or closed-loop control device, according to embodiments of the invention, can be integrated in the frequency converter or can be afforded by a central engine control system. The latter can be arranged directly on the internal combustion engine or by way of a data remote transmission communication remotely from the internal combustion engine.

The at least one ramp can preferably provide an increase or a reduction in the rotary frequency between 0.1 Hz/s (Hertz per second) and 10 Hz/s, preferably between 0.25 Hz/s and 7 Hz/s, and particularly preferably between 0.5 Hz/s and 3 Hz/s. Particularly, preferably, the ramp can provide an increase or reduction in the rotary frequency of 1 Hz/s if, for example, there is a rotary frequency of 50 Hz during operation of the internal combustion engine (and self-evidently 0 Hz when stopped). At other rotary frequencies during operation, the rate of change in the ramp can be correspondingly scaled.

In the context of open-loop or closed-loop control of the centrifuge pump in accordance with the setpoint value (e.g., in particular, rotary speed of the pump motor), open-loop or closed-loop control of the delivery pressure of the at least one centrifuge pump and/or the centrifuge rotary speed can be superimposed.

The at least one centrifuge can be self-lubricated by the lubricant volumetric flow directed into the at least one centrifuge. For that purpose, for example, a small proportion of the lubricant volumetric flow can be branched off and used for lubrication of a rotor of the at least one centrifuge, instead of for driving the at least one centrifuge. That can provide for hydrostatic or hydrodynamic lubrication of the centrifuge rotor.

The gradual, that is to say, relatively slow, increase or reduction in lubrication, according to embodiments of the invention, prevents instabilities of the rotor of the at least one centrifuge.

Preferably, an intake line of the at least one centrifuge pump can be connected—preferably directly—to at least one of the following: a backflush line of a backflush filter, a discharge of a central lubricant reservoir, a lubricant return line from an oil mist separator of a crankcase breather system, or a lubricant return line from a turbocharger lubricant arrangement. In that case, the intake line can be connected to a line for separated lubricant from the oil mist separator and/or a return line from the turbocharger lubrication arrangement—preferably directly.

The oil mist separator is to be interpreted as a general lubricant separator, which, however in the terminology in the art, is referred to as an oil mist separator, even if the lubricant, for example, has additives or is not oil-based.

The efficiency in the separation of foreign particles from the lubricant depends in the case of centrifuges on various parameters. They include the amount of foreign particles in the medium to be cleaned, the density of the foreign particles in comparison with the density of the lubricant, and the rotary speed of the at least one centrifuge.

The feed of lubricant loaded with foreign particles to the at least one centrifuge from the backflush line of a backflush filter, the discharge of a central lubricant reservoir, the lubricant return line from the oil mist separator of a crankcase breather system, and/or the lubricant return line from the turbocharger lubrication arrangement can be particularly advantageous, because recycled lubricant from those sources can contain particularly high levels of loading with foreign particles and, as a result, the efficiency of separation by the at least one centrifuge can be maximized.

In particular, in that case, the intake line of the at least one centrifuge pump can be connected to the backflush line, the lubricant return line from the oil mist separator, and/or the lubricant return line from the turbocharger lubrication arrangement, such that during operation of the internal combustion engine, a main part of the lubricant volumetric flow directed into the at least one centrifuge originates from the backflush line, the oil mist separator, and/or the turbocharger lubrication arrangement. A main part of the lubricant can constitute more than 50%—preferably more than 75% and particularly preferably more than 90%—measured in respect of the weight and/or volume of the lubricant. A loss in regard to the above-described effect due to dilution of the foreign particles, for example, in an oil pan, can be prevented thereby.

It can be particularly advantageous, in the context of embodiments of the invention, if in the normal situation, operation of the at least one centrifuge with lubricant only from the specified sources (e.g., backflush line of a backflush filter, discharge of a central lubricant reservoir, lubricant return line from the oil mist separator of a crankcase breather system, or lubricant return line from the turbocharger lubrication arrangement) would not function, as there would not be enough pressure, which can be solved in particular by a dedicated centrifuge pump separate from a central lubricant pump. Therefore, in the embodiment described here, the efficiency of separation of foreign particles can be improved by embodiments of the invention without having to use more expensive or more filters or centrifuges.

In accordance with embodiments of the invention, the at least one centrifuge and the at least centrifuge pump can, however, be activated even when the internal combustion engine is not in operation, that is to say, the lubricant can be purified while the internal combustion engine is stopped. Lubricant from a central lubricant reservoir (for example, oil pan) can be used for that purpose.

The backflush filter can be a main filter for lubricant for lubricating machine elements in a crankcase of the internal combustion engine.

There can preferably be provided a lubricant circuit and a central lubricant pump for delivery of the lubricant through the lubricant circuit, in which case the central lubricant pump is preferably separate from the at least one centrifuge pump. By virtue of the latter, the at least one centrifuge pump can be available in a dedicated fashion for providing or boosting the lubricant volumetric flow directed into the at least one centrifuge (e.g., dedicated centrifuge pump).

The at least one centrifuge pump can be a gear pump.

There can be provided at least one filter connected in parallel with the at least one centrifuge—and preferably parallel with the centrifuge pump—, which filter is preferably designed for the separation of particles above a certain size. Accordingly, the at least one filter and the at least one centrifuge, which separates foreign particles more on the basis of differences in density of the foreign particles relative to the lubricant, than on the basis of particle size, supplement each other.

The internal combustion engine can be a reciprocating piston engine with any number of cylinders.

The internal combustion engine can be a—preferably stationary—gas engine, which can preferably be provided for operating a genset (that is to say, a combination of a generator for generating electrical power, and a stationary internal combustion engine for driving the generator).

BRIEF DESCRIPTION OF THE DRAWINGS

Further advantages and details of the invention will be apparent from the Figures and the related specific description. In the Figures.

DETAILED DESCRIPTION

Figure 1:
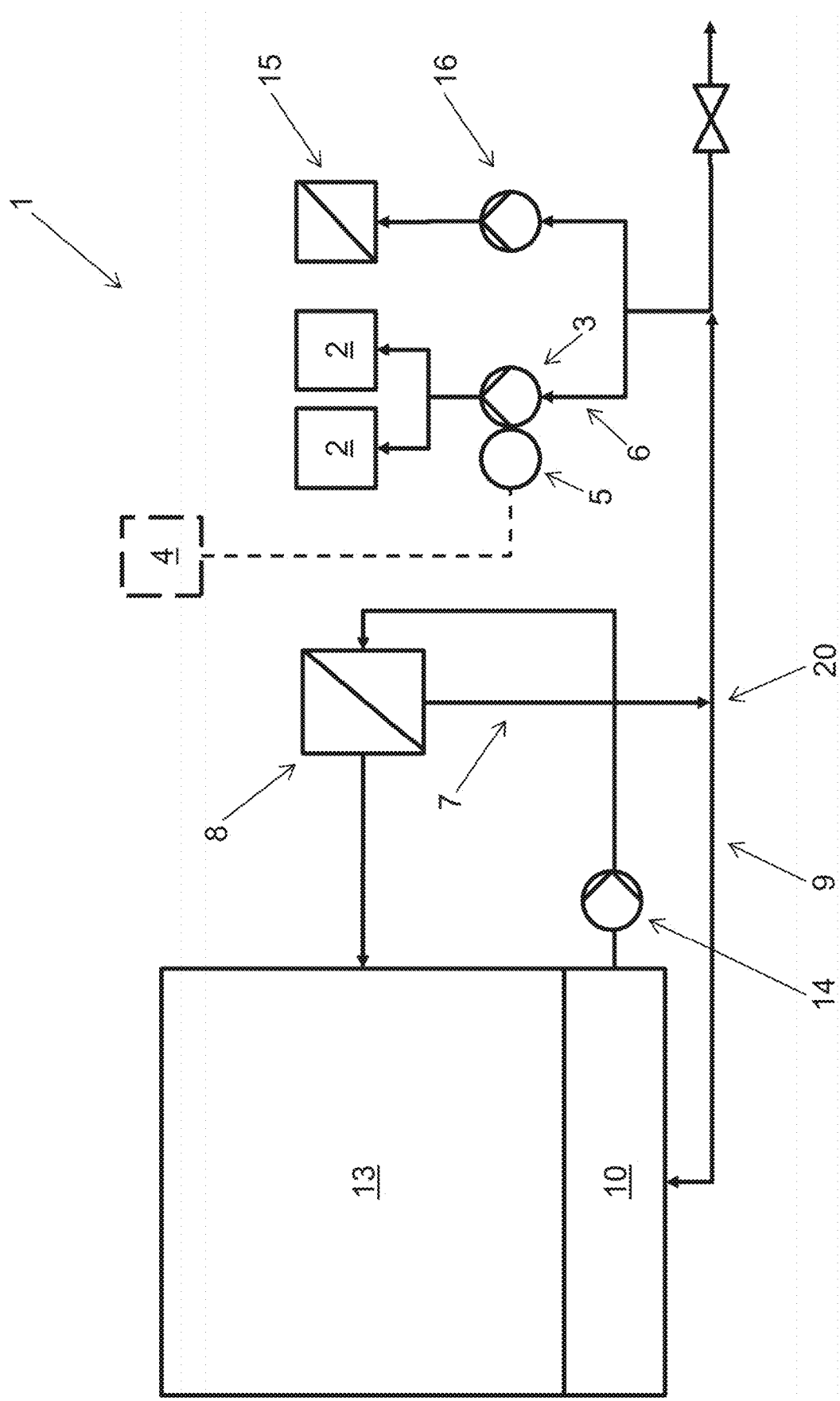
FIG. 1 shows a first embodiment of the invention.

FIG. 1 diagrammatically shows an internal combustion engine 1 according to a first embodiment of the invention—in this case a stationary gas engine of reciprocating piston type.

The crankcase 13 includes a central lubricant reservoir 10 (e.g., oil sump or oil pan), wherein lubricant is conveyed by means of a central lubricant pump 13 through a backflush filter 8 acting as a main filter in order with the lubricant which is filtered in that way to lubricate the machine elements within the crankcase 13 like, for example, pistons and cylinders, cranks and crankshaft, and the bearings and connecting points thereof.

Further devices for achieving or improving the lubricant quality are on the one hand at least one centrifuge 2, and on the other hand a filter 15 connected in parallel.

This embodiment has two centrifuges 2.

The centrifuges 2 are so designed that a lubricant volumetric flow into the centrifuges 2 serves to drive the rotors of the centrifuges 2.

To provide that lubricant volumetric flow into the centrifuge 2, the arrangement has a dedicated centrifuge pump 3, that is to say, that is separate from the central lubricant pump 14.

There is also a separate pump 16 for charging the filter 15.

The intake line 6 of the centrifuge pump 3, in the embodiment shown in FIG. 1, is connected on the one hand to a backflush line 7 of the backflush filter 8, and on the other hand to the discharge 9 of the central lubricant reservoir 10. That is effected by way of a T-piece 20 connecting the intake line 6 to the backflush line 7 and the discharge 9. The T-piece 20 prevents, on the one hand, a reverse action on the backflush filter 8 and, on the other hand, when the engine is stopped, permits operation of the centrifuge 2 with oil from the lubricant reservoir 10.

Directly connecting the backflush line 7 to the intake line 6 prevents the lubricant from the backflush filter 8, that is charged with a relatively large number of foreign particles, being mixed with the lubricant in the central lubricant reservoir 10 and the foreign particles thereby being distributed in a relatively large amount of lubricant. That is advantageous because a relatively large amount of the foreign particles in the centrifuged lubricant enhances the effectiveness of separation by the centrifuges 2.

As the pressure in the lubricant from the discharge 9 and the backflush line 10 would generally not be sufficient to operate the centrifuges 2, the arrangement has the dedicated centrifuge pump 3.

The centrifuge pump 3 is driven by the pump motor 5, which can be open-loop or closed-loop controlled by way of a frequency converter. Control is effected by way of an open-loop or closed-loop control device 4.

Without the open-loop or closed-loop control, according to embodiments of the invention, of the centrifuge pump 3, no more lubricant would abruptly be delivered when the internal combustion engine 1 is switched off, whereby the lubricant volumetric flow into the centrifuges 2 would also abruptly cease. That would result in unstable rotation of the centrifuge rotor, which would lead to damage to the centrifuges 2 or at least to greatly increased wear and also severe production of noise.

According to embodiments of the invention, therefore, there is provided an open-loop controlled or closed-loop controlled gradual startup and shutdown of the centrifuge pump 3 in order to avoid the instabilities of the centrifuge rotor upon shutdown of the centrifuge pump 3 and pressure peaks upon starting of the centrifuge pump 3 (e.g., when the centrifuge rotors are not yet rotating or are still rotating too slowly).

The lubricant purified by the centrifuge 2 can be fed, for example, to the lubricant reservoir 10 by way of a line (not shown).

Figure 2:
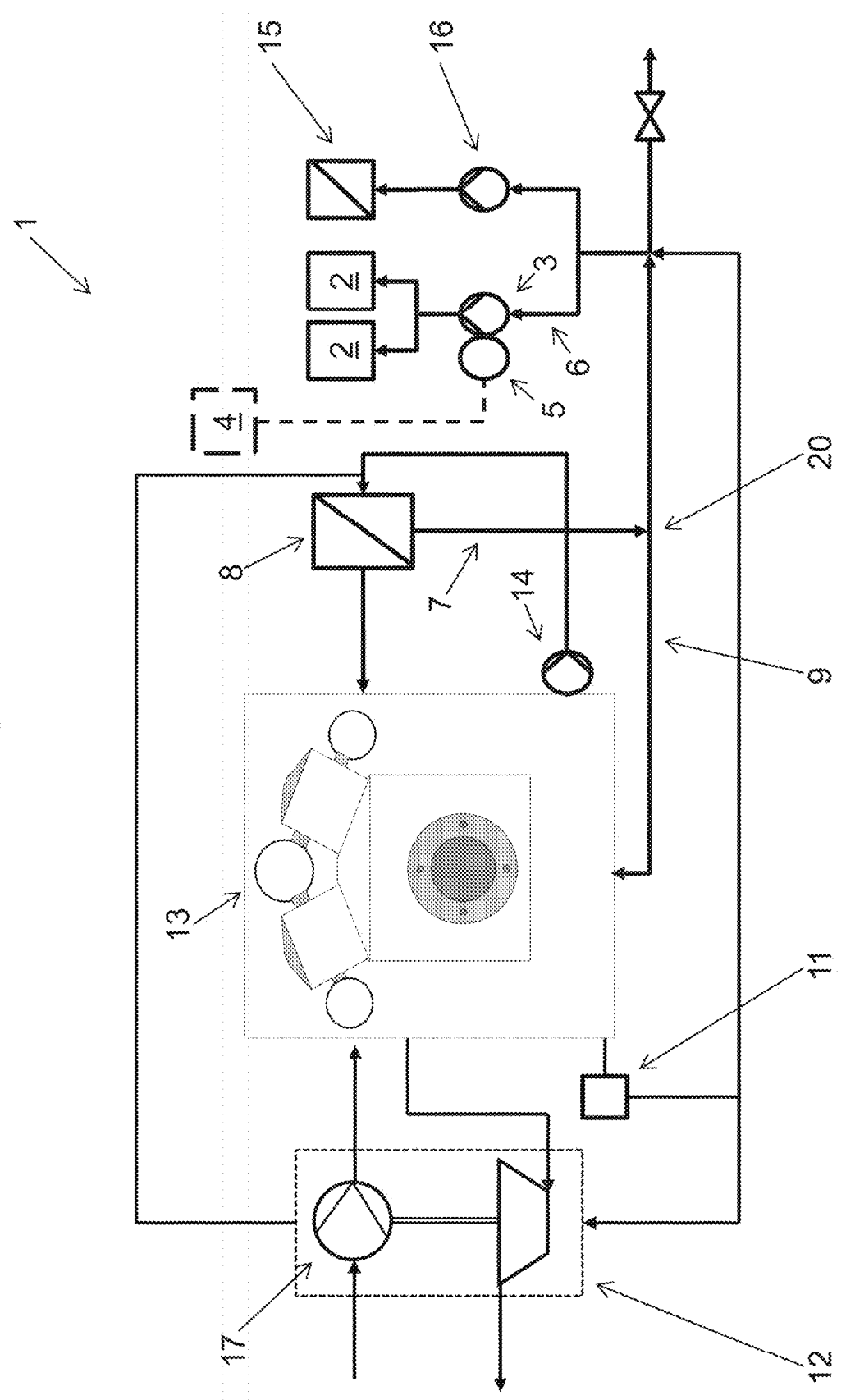
FIG. 2 shows a second embodiment of the invention.

The embodiment shown in FIG. 2 is similar to that of FIG. 1, wherein, in addition, there are provided a turbocharger lubrication arrangement 12 for a turbocharger 17 and an oil mist separator 11 for a crankcase breather system. Mostly, a high concentration of particles is also to be found in the lubricant from the lubricant return line from the turbocharger lubrication arrangement 12 and from the lubricant return line from the crankcase breather system. Those sources are, therefore, also highly suitable for being fed to the separation operation by a centrifuge 2, for which reason, also the lubricant return lines from the turbocharger lubrication arrangement and the oil mist separator are connected to the intake line 6 of the centrifuge pump 3.

It is to be noted that the embodiments can be freely combined in relation to the turbocharger lubrication arrangement 12, the oil mist separator 11, the discharge 9 from the central oil reservoir 10, and the return 7 of the backflush filter 8.

LIST OF REFERENCES

1 internal combustion engine
2 centrifuge
3 centrifuge pump
4 closed-loop control device
5 pump motor
6 intake line
7 return
8 backflush filter
9 discharge
10 oil reservoir
11 oil mist separator
12 turbocharger lubrication arrangement
13 crankcase
14 lubricant pump
15 filter
16 pump
17 turbocharger
20 T-piece

The invention claimed is:

1. An internal combustion engine, comprising
at least one centrifuge configured to separate foreign particles from a lubricant, wherein the at least one centrifuge is so designed that a lubricant volumetric flow of the lubricant directed into the at least one centrifuge produces and/or maintains a rotational movement of the at least one centrifuge,
at least one centrifuge pump configured to produce and/or increase the lubricant volumetric flow of the lubricant directed into the at least one centrifuge, and
an open-loop or closed-loop controller configured to provide an open-loop and/or closed-loop control of the at least one centrifuge pump according to a setpoint value for a kinematic operating parameter and/or for a setting parameter of the centrifuge pump,
wherein the open-loop or closed-loop controller is configured to gradually change the setpoint value for the open-loop or closed-loop control of the at least one centrifuge pump upon shutdown or starting of the at least one centrifuge pump.

2. The internal combustion engine as set forth in claim 1, wherein the open-loop or closed-loop controller is configured to gradually reduce the setpoint value for the open-loop and/or closed-loop control of the at least one centrifuge pump upon shutdown of the at least one centrifuge pump and/or to gradually increase the setpoint value upon starting of the at least one centrifuge pump.

3. The internal combustion engine as set forth in claim 1, wherein the open-loop or closed-loop controller is configured to reduce or increase the setpoint value in accordance with at least one ramp.

4. The internal combustion engine as set forth in claim 3, wherein the open-loop or closed-loop controller is configured to adjust the setpoint value in accordance with at least one ramp that provides an increase or a reduction in a rotary frequency of the at least one centrifugal pump between 0.1 Hz/s and 10 Hz/s.

5. The internal combustion engine as set forth in claim 3, wherein the open-loop or closed-loop controller is configured to adjust the setpoint value in accordance with at least one ramp that provides an increase or a reduction in a rotary frequency of the at least one centrifugal pump between 0.25 Hz/s and 7 Hz/s.

6. The internal combustion engine as set forth in claim 3, wherein the open-loop or closed-loop controller is configured to adjust the setpoint value in accordance with at least one ramp that provides an increase or a reduction in a rotary frequency of the at least one centrifugal pump between 0.5 Hz/s and 3 Hz/s.

7. The internal combustion engine as set forth in claim 1, comprising a pump motor coupled to the at least one centrifuge pump, wherein the setpoint value is a rotary speed of the pump motor.

8. The internal combustion engine as set forth in claim 1, wherein the at least one centrifuge pump is configured to supply the lubricant volumetric flow of the lubricant into the at least one centrifuge independent from a state of the internal combustion engine, wherein the state includes an operating state and a non-operating state of the internal combustion engine.

9. The internal combustion engine as set forth in claim 1, wherein, upon the open-loop or closed-loop control of the at least one centrifuge pump in accordance with the setpoint value, the open-loop or closed-loop controller is configured to provide open-loop or closed-loop control of a delivery pressure of the at least one centrifuge pump and/or a centrifuge speed of rotation of the at least one centrifuge pump.

10. The internal combustion engine as set forth in claim 1, wherein the at least one centrifuge is self-lubricated by the lubricant volumetric flow of the lubricant directed into the at least one centrifuge.

11. The internal combustion engine as set forth in claim 1, wherein an intake line of the at least one centrifuge pump is coupled at least one of: a backflush line of a backflush filter, a discharge of a central lubricant reservoir, a lubricant return line from an oil mist separator of a crankcase breather system, or a lubricant return line from a turbocharger lubrication arrangement.

12. The internal combustion engine as set forth in claim 11, wherein the backflush filter is a main filter for the lubricant for the lubrication of machine elements in a crankcase of the internal combustion engine.

13. The internal combustion engine as set forth in claim 1, further comprising a lubricant pump of the internal combustion engine, wherein the at least one centrifuge pump is separate from the lubricant pump.

14. The internal combustion engine as set forth in claim 1, comprising at least one filter connected in parallel with the at least one centrifuge.

15. The internal combustion engine as set forth in claim 1, wherein the internal combustion engine is a reciprocating piston engine.

16. The internal combustion engine as set forth in claim 1, wherein the at least one centrifuge comprises a plurality of centrifuges, and the at least one centrifuge pump is configured to produce and/or increase the lubricant volumetric flow of the lubricant directed into the plurality of centrifuges to produce and/or maintain the rotational movement of the plurality of centrifuges.

17. The internal combustion engine as set forth in claim 1, wherein the same lubricant is cleaned while driving the rotational movement of the at least one centrifuge, the at least one centrifuge is driven only by the lubricant volumetric flow of the lubricant, and the open-loop or closed-loop controller is configured to gradually increase the lubricant volumetric flow of the lubricant during the starting and gradually decrease the lubricant volumetric flow of the lubricant during the shutdown.

18. A system, comprising
an open-loop or closed-loop controller configured to:
provide an open-loop and/or closed-loop control of at least one centrifuge pump according to a setpoint value for a kinematic operating parameter and/or for a setting parameter of the at least one centrifuge pump, wherein the at least one centrifuge pump is configured to produce and/or increase a lubricant volumetric flow of a lubricant directed into at least one centrifuge, wherein the at least one centrifuge is configured to separate foreign particles from the lubricant, wherein the at least one centrifuge is so designed that the lubricant volumetric flow of the lubricant directed into the at least one centrifuge produces and/or maintains a rotational movement of the at least one centrifuge; and
gradually change the setpoint value for the open-loop or closed-loop control of the at least one centrifuge pump upon shutdown or starting of the at least one centrifuge pump.

19. The system as set forth in claim 18, comprising the at least one centrifuge, the at least one centrifuge pump, an internal combustion engine, or a combination thereof.

20. The system as set forth in claim 18, wherein the open-loop or closed-loop controller is configured to gradually reduce the setpoint value for the open-loop and/or closed-loop control of the at least one centrifuge pump upon shutdown of the at least one centrifuge pump and/or to gradually increase the setpoint value upon starting of the at least one centrifuge pump.

21. The system as set forth in claim 18, wherein the open-loop or closed-loop controller is configured to reduce or increase the setpoint value in accordance with at least one ramp, wherein the at least one ramp provides an increase or a reduction in a rotary frequency of the at least one centrifuge pump between 0.1 Hz/s and 10 Hz/s.

22. A method, comprising
providing an open-loop and/or closed-loop control, via an open-loop or closed-loop controller, of at least one centrifuge pump according to a setpoint value for a kinematic operating parameter and/or for a setting parameter of the at least one centrifuge pump, wherein the at least one centrifuge pump is configured to produce and/or increase a lubricant volumetric flow of a lubricant directed into at least one centrifuge, wherein the at least one centrifuge is configured to separate foreign particles from the lubricant, wherein the at least one centrifuge is so designed that the lubricant volumetric flow of the lubricant directed into the at least one centrifuge produces and/or maintains a rotational movement of the at least one centrifuge; and
gradually changing the setpoint value for the open-loop or closed-loop control, via the open-loop or closed-loop controller, of the at least one centrifuge pump upon shutdown or starting of the at least one centrifuge pump.

* * * * *